United States Patent [19]

Houck et al.

[11] Patent Number: 5,488,693
[45] Date of Patent: Jan. 30, 1996

[54] PROTOCOL WITH CONTROL BITS AND BYTES FOR CONTROLLING THE ORDER OF COMMUNICATIONS BETWEEN A MASTER PROCESSOR AND PLURAL SLAVE PROCESSORS

[75] Inventors: Warren B. Houck, Fair Haven; Vincent A. Illuzzi, Toms River; Mary E. Ricker, Hazlet; Richard S. Vidil, Eatontown, all of N.J.

[73] Assignee: AT&T Corp., Murray Hill, N.J.

[21] Appl. No.: 903,304

[22] Filed: Jun. 24, 1992

[51] Int. Cl.$^6$ ........................................ H04B 3/00
[52] U.S. Cl. ........................ 395/200.05; 395/200.17; 395/800; 364/DIG. 1; 364/230.4; 364/240.8; 340/825.05
[58] Field of Search ........................ 395/200, 275, 395/325, 725, 800; 340/825.05, 825.06, 825.07, 825.08; 370/85.11

[56] References Cited

U.S. PATENT DOCUMENTS

| | | | |
|---|---|---|---|
| 3,728,681 | 4/1973 | Fuller et al. | 340/147 R |
| 4,145,739 | 3/1979 | Dunning et al. | 395/800 |
| 4,148,011 | 4/1979 | McLagan et al. | 395/325 |
| 4,281,380 | 7/1981 | De Mesa, III et al. | 395/325 |
| 4,598,363 | 7/1986 | Clark et al. | 395/250 |
| 4,888,728 | 12/1989 | Shirakawa et al. | 395/200 |
| 4,920,486 | 4/1990 | Nielsen | 395/325 |
| 5,049,872 | 9/1991 | Yamanaka et al. | 340/825.05 |
| 5,059,926 | 10/1991 | Karczewski | 331/47 |

Primary Examiner—Thomas C. Lee
Assistant Examiner—Lance L. Barry
Attorney, Agent, or Firm—John A. Caccuro

[57] ABSTRACT

A protocol controls communications between a master unit and a plurality (M) of slave units connected thereto. The master unit sends a downlink message over a first communication path to the M slave units, the downlink message including a number N of information bytes, where $N \geq M$, each byte except a last byte comprising a data portion followed by a first predetermined control bit and the last byte comprising a status portion followed by a second predetermined control bit. The master unit receives uplink messages over a second communication path from the M slave units, the uplink messages having the same format as downlink messages. A third communication path connects between the master unit and the M slave units enabling a first slave unit to signal other slave units of the first slave unit's desire to send information to the master unit.

20 Claims, 6 Drawing Sheets

PROTOCOL WITH CONTROL BITS AND BYTES FOR CONTROLLING THE ORDER OF COMMUNICATIONS BETWEEN A MASTER PROCESSOR AND PLURAL SLAVE PROCESSORS

TECHNICAL FIELD

This invention relates to a telecommunication system and, more particularly, to a protocol for controlling communications between a master processor and slave processors connected thereto.

BACKGROUND OF THE INVENTION

Today, computers and other intelligent adjuncts can be arranged to establish communication connections to a variety of communication systems. In some arrangements these adjuncts interface to the system over separate extension lines using tip/ring or proprietary system signaling. What is desirable is an arrangement whereby an adjunct may connect directly to a system station terminal and share communication access to the extension line. Such an arrangement would be more desirable if connection of the adjunct to the station terminal required minimal or no changes to the station terminal.

SUMMARY OF THE INVENTION

The above problem is solved using the method and apparatus of the present invention wherein a communication arrangement is disclosed for enabling a master processor unit to communicate over a bus connected to a plurality (M) of slave processor units. In one illustrative embodiment of the present invention, the master unit and two slave units are part of a station terminal and the communication paths (or bus) which interconnect them are made accessible to one or more external adjuncts, which each include a slave processor unit.

More particularly, the master unit sends master information in a downlink message frame over a first communication path to the M slave units, the downlink message frame including a number N of information bytes, where $N \geq M$, each byte except a last byte comprising a data portion followed by a first predetermined control bit and the last byte comprising a status portion followed by a second predetermined control bit. The master unit receives slave information in an uplink message frame over a second communication path from at least one of the M slave units, the uplink message frame including at least one said information byte where every byte except a last byte comprises a data portion followed by a first predetermined control bit and the last byte comprises a status portion followed by a second predetermined control bit. A third communication path (hereinafter referred to as the OK lead) connects between the master unit and the M slave units enabling a first slave unit to signal other slave units of the first slave unit's desire to send information to the master unit. In accordance with the present invention, at least one slave unit operates to monitor a state of the third path during the reception of the downlink message frame over the first path and in response to a first state of the third path and an indication that that slave unit is to send an uplink message frame over the second path following the reception of the downlink message, that slave unit establishes a second state on the third path during a predetermined unique byte of the received downlink message frame.

DETAILED DESCRIPTION

In the following description, each item or block of each figure has a reference designation associated therewith, the first number of which refers to the figure in which that item is first located (e.g., 110 is located in FIG. 1 and step 602 is located in FIG. 6).

Figure 1:
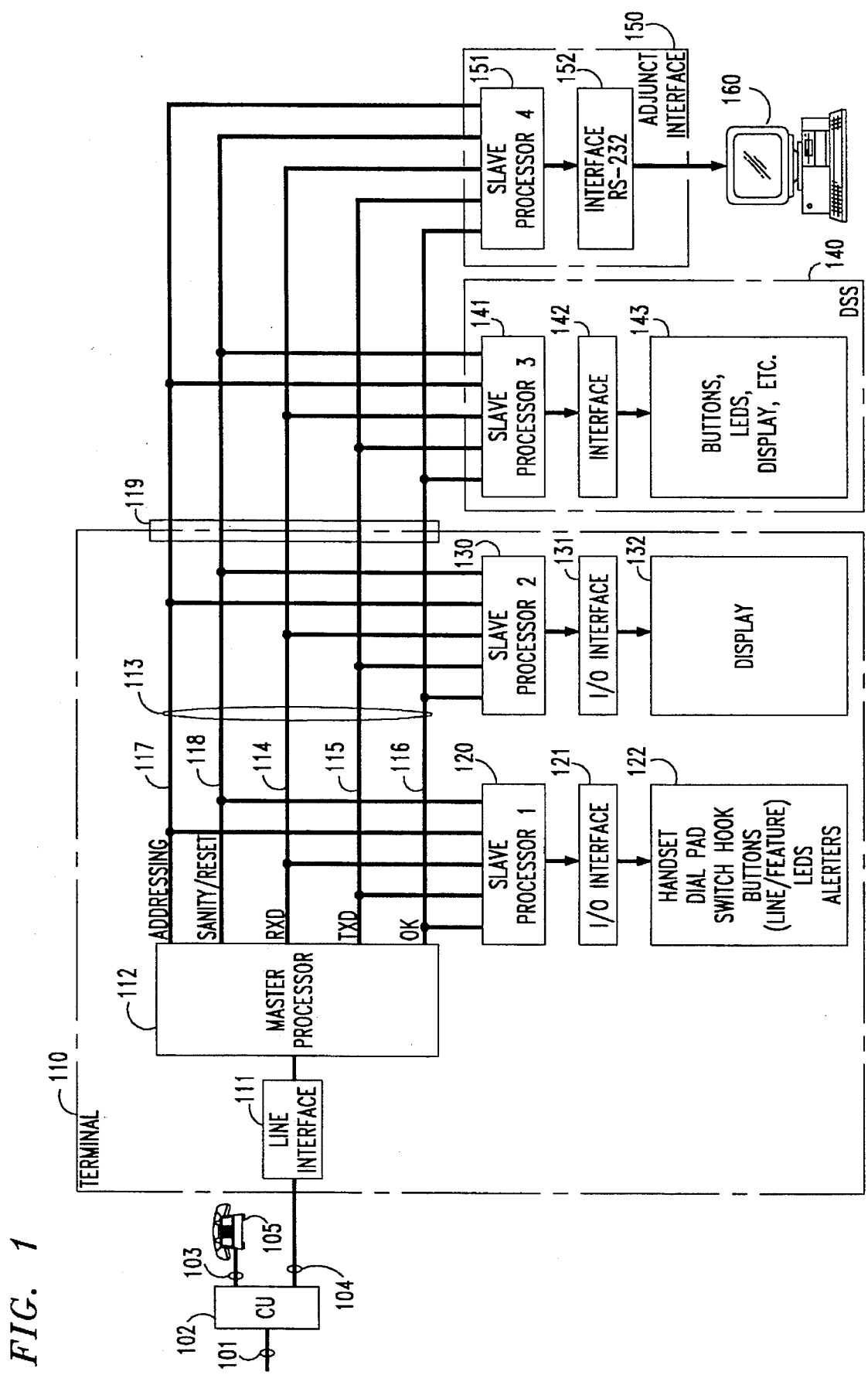
FIG. 1 is a block diagram of a telephone communication system including a terminal which is useful for describing the present invention.

Shown in FIG. 1 is an illustrative block diagram of a communication system useful for describing the operation of the present invention. The system includes common control unit 102 which connects to one or more central office (CO) or PBX lines 101 and which connects via extension lines 103, 104 to a plurality of station terminals 105–110. Illustratively, the communication system may be a Merlin® communication system such as described in U.S. Pat. No. 4,560,837 issued to Carson et al on Dec. 24, 1985. (Merlin is a registered trademark of AT&T).

Each station terminal e.g., 110 may, illustratively, be represented as including line interface 111, master processor 112 (including an internal program memory and data memory) and one or more secondary slave processors (120 and 130 in our example). The master processor 112 connects to slave processors 120 and 130 over a communication bus 113. Communication bus 113 includes a transmit path (TXD) 114, received path (RXD) 115, signaling path (OK) 116, and, optionally, address path 117 and sanity/reset path 118. An interface or connector 119 enables one or more external adjuncts (also referred to hereinafter as devices) 140 and 150 to connect to communication bus 113.

Slave processor 120 connects via I/O interface 121 to user I/O unit 122 which includes elements such as terminal handset, dial pad, switch hook, buttons (line/feature) alerters, and light emitting diodes (LEDs). Slave processor 130 connects via I/O interface 131 to display unit 132 of terminal 110. Obviously, the assignment of user input/output elements can be distributed differently between slave processors 120 and 130. Additionally, a different number of slave processors may be utilized.

The external adjuncts, illustratively, may include a well-known direct station selection (DSS) unit 140 and an adjunct interface 150 which interfaces personal computer (PC) 160 to communication bus 113. The DSS unit 140, illustratively, includes slave processor 141, user interface 142 and a User I/O unit 143 including buttons, LEDs, and optionally a display unit. Adjunct interface 150, illustratively, includes slave processor 151 and an RS-232 interface 152 which interfaces to PC 160. In accordance with the present invention, master processor 112 uses the station communication protocol to communicate over communication bus 113 with both the internal slave processors 120 and 130 as well as the external slave processors 141 and 151 located, respectively, in DSS 140 and adjunct interface 150.

Downlink Messaging

Figure 2:
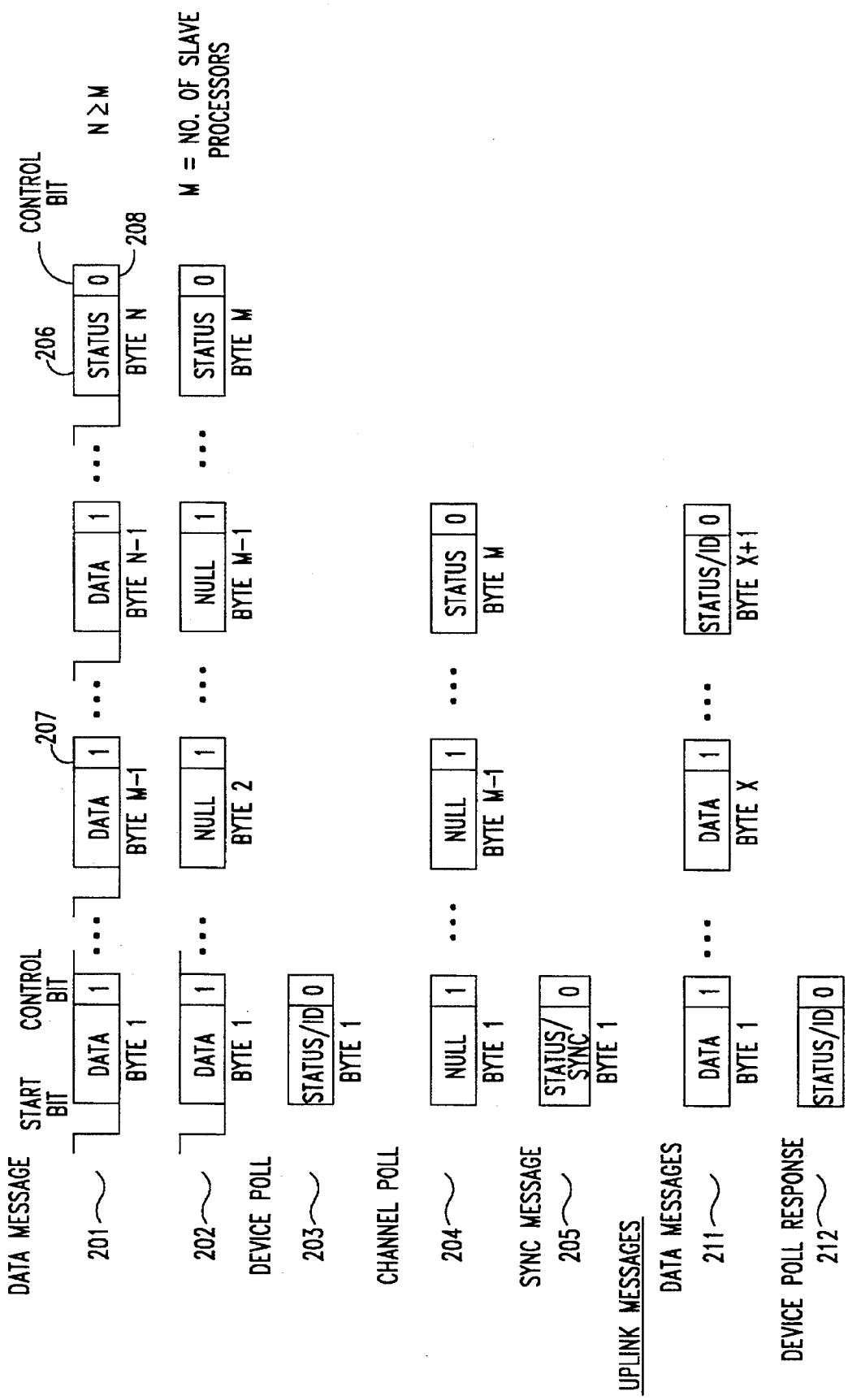
FIG. 2 shows the data format of various downlink and uplink messages.

With reference to FIGS. 1 and 2 we describe the various downlink messages 201–205 and uplink messages 211 and 212. Each downlink message includes one or more bytes each including a start bit, eight data bits, and a control bit. Downlink messages are sent over bus TXD from the master to slave processors and can be of four types: data messages 201, 202; channel polls, 204; device polls, 203; and synchronization messages 205. Each downlink message contains two important features, the status byte 206 and the control or 9th bit. In the downlink message the status byte is used for flow control and device polling 203. The status byte is appended to all data messages 201, 202 and channel polls 204. A device poll message 203 consists of only the status byte sent to the slave processors. The 9th data bit in each message byte is used as a control bit to signal the last byte in a message. All multi-byte messages have the 9th bit set to a logical "1" (e.g., 207), except for the last byte, which has the 9th bit (e.g., 208) set to a logical "0". A "0" control bit, therefore, signals the last byte in a message sequence. For data messages 201, 202 and channel polls 204, which are multi-byte messages, the control bit is set to "0" in the status byte. Single byte device poll 203 or sync 205 messages always have the control bit set to "0".

When each slave processor 120, 130, 141 and 151 is first connected to bus 113 it must ignore the first downlink message, for it is not easily determined whether the bytes received are the entire message, or merely a portion. After discarding the first message, the downlink slave processors are now in sync, and are expected to process all further messages. This prevents slave processors that "come alive" in the middle of a transmission from attempting to decode an incomplete downlink message.

All data transmitted from the master processor to secondary processors use the "data message" format shown in 201 and 202. The data message is sent asynchronously down the TXD path with the status byte appended as the last byte of the data message, and with the 9th bit set for all but the status byte. The data messages are multi-byte messages, with their minimum length set by the number (M) of possible slave processors (one byte per slave processor). Since our illustrative system of FIG. 1 includes four slave processors 120, 130, 141 and 151, M is equal to 4. Data message 201 illustrates a generalized data message having N bytes, N–1 data bytes and one status byte, where N≧M. Data message 202, illustrates a data message having the minimum number of bytes, namely, M, one byte for each slave processor and one status byte. If master processor wants to transmit only one byte of data then the remaining M–1 data bytes of data message 202 have null data therein.

The status byte can be coded in two manners: response XON or response XOFF. When master processor 112 determines that it can receive data back from slave processors, the status byte is coded response XON. In this case, a slave processor that currently has control of the uplink channel may transmit an uplink message to the master processor 112. A response XOFF, contrarily, is sent when the master processor cannot accept new data.

Channel polls 204 are fixed length, multi-byte (M bytes) frames. Channel polls are sent periodically when the master processor does not have any data to send. Since the interface is half duplex and polled, this allows slave processors to send uplink data, without requiring the master processor first having to send data. A channel poll consists of a number (M–1) of bytes set to null, with a control bit set to "1", followed by a status byte with a control bit set to "0".

The master processor 112 sends a device poll 203 to check for the existence of a specific slave processor. The device poll 203 is a single byte message encoded with the address of the specific slave processor and with a control bit of "0". The master uses this information to determine not only all the slave processors connected to bus 113, but, more importantly, which slave processors are connected to interface 119. After sending the device poll, the master sends either a channel poll or data message, to give the slave processor in question an opportunity to send a data message 211 or device poll response 212.

A slave processor may not respond directly to a device poll 203. It must wait until the next channel poll 204 or data message 201 to respond. The slave processor responses or "Uplink Messages" will be discussed in a later paragraph.

Some slave processors need to maintain a synchronized time base, for example, to synchronize the LED flash patterns associated with line buttons on a DSS. To facilitate this, the master processor sends a synchronization (sync) message at a time base that can subdivide each timing pattern an integral number of times. Upon receiving this message all slave processors adjust their timing generators to a predefined state.

A sync message 205 is one byte encoded with the timing (e.g., flashing) pattern and with the control bit set to "0". A slave processor may not respond to a synchronization message. All slave processors have a table (not shown) that defines the states of their timing-dependent variables. After receiving the sync message 205 they reset their pointer in this table, and their time base, so that every slave processor is now at a predefined state. The offset into the table is chosen so that all the patterns are in the same state during the re-synchronization interval and the intervals before and after. This is to prevent "snapping" into a state, which could happen if the re-sync happened at a transition edge. Synchronization messages are also used for slave processor sanity verification. This will be discussed in a subsequent paragraph.

Uplink Messages

Uplink messages are sent over RXD path 114 from the slave processors to the master processor. There are two types of uplink messages: date messages 211 and device poll responses 212. Uplink messages are similar to downlink messages. Data messages 211 are used to send data from the slave processors to the master processor. They are multi-byte data frames having at least one data byte and one status byte and using the same format as master processor data message 201. Device poll responses 212 are sent in response to a device poll from the master. Device poll responses are single byte frames including only a status byte.

The control bit is used as previously described for downlink messages. The status byte is described as follows. In the uplink direction the status byte is used for adjunct identification (ID). The status/ID byte for each slave processor is unique and predefined, and appended to all data messages.

Device poll responses 212 consist only of an ID status byte. Device poll responses are sent after a slave device receives a device poll and must respond at the first opportunity it has to access the uplink channel. The device poll response is simply a status/ID byte sent by itself with the control bit set to "0".

Since the status/ID byte is appended to all data messages 211, sending a data message also answers a device poll. If a slave processor has data to send and also must respond to a device poll, sending the data message will satisfy both requirements. A device poll response 212 is sent only when there is no data to send from a polled slave processor.

Figure 3:
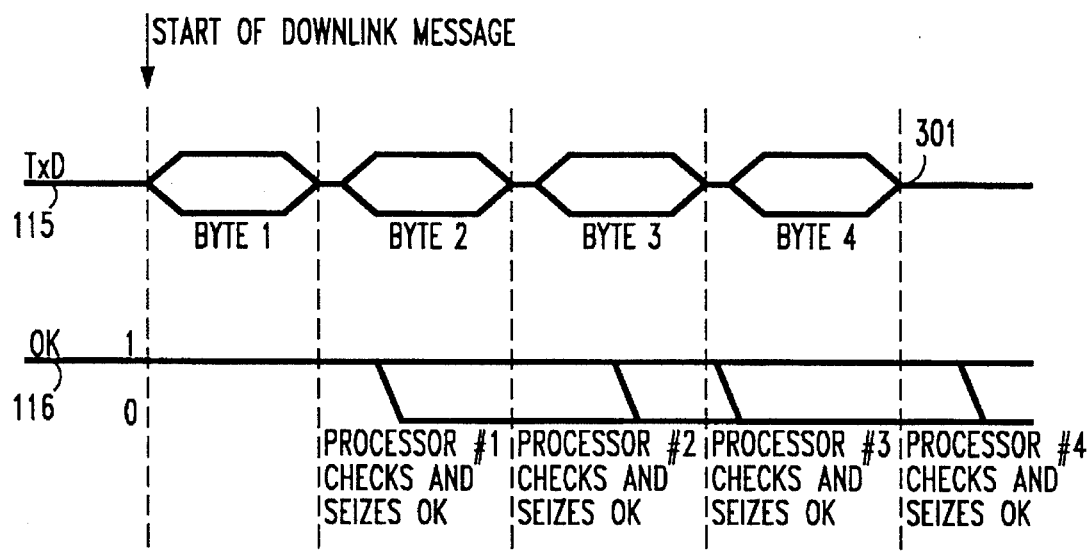
FIG. 3 shows a timing diagram illustrating how a slave processor seizes the OK lead during its associated byte interval.

Because there are a plurality of slave processors a transmit priority scheme is needed. With reference to FIG. 3 we describe the transmit priority scheme in detail. To prevent message collisions the slave processors use a signaling path 116 (OK lead) to signal that the uplink channel is in use.

Each slave processor is assigned a byte of the downlink message after which it can check the OK lead and acquire control of the uplink channel (i.e., RXD path). Uplink data messages 211 can only be sent after receipt of a multiple byte downlink message (data message 201 or channel poll 204). The slave processors check the first byte of the message and if the control bit is set to "0" then the message is single byte, and uplink messages cannot be sent. Each slave processor checks the status of the OK lead 116 after receipt of a different preassigned byte. The first slave processor in the chain (i.e., 120) checks OK lead after it receives the first byte. The second slave processor in the chain (i.e., 130) checks OK lead after it receives the second byte. The third processor in the chain (i.e., 130) checks OK lead after it receives the third byte, and so on. Therefore as previously discussed, the minimum number of bytes in a downlink data message 201, 202 or channel poll 204 (including the status byte) must therefore be equal to the number of slave processors on the link (M in our example).

All slave processors must seize the OK lead (i.e., set it to "0") prior to full receipt of the next byte (e.g., processor 1 must seize before end of byte 2), so that the OK lead is stable before the next slave processor in the chain checks.

Once a slave processor has seized the OK lead, it must wait until the status byte (last byte of the message, with control bit set to "0") has been received, 301, before it can determine whether it may transmit an uplink message. If the status byte 206 is set to XON, the slave processor or device can begin transmitting the uplink data message 211 immediately after receiving the status byte. If the status byte 206 is set to XOFF, then no uplink message may be sent. The slave processor should not relinquish control of the OK lead, however, in order to keep data messages from the various slave processors in time-order. The waiting slave processor holds the OK lead seized and continues to check subsequent status bytes until an XON status byte is sent again, after which it sends its data message. Data transmission from other slave processors will then wait until the waiting slave processor transmits, thereby preserving the order of data transmission. This data transmission order ensures that the timing of events at different slave processors are received in the correct order at master processor unit 112. Channel polls are sent with XOFF status byte in order to allow slave processor to gain control of OK lead, but then not actually transmit data until the master processor is ready.

For certain types of data, control of the OK lead signifies continuing events. For events where time duration is critical, and intervening events by other slave processors should not interfere, a slave processor can hold the OK lead and block the uplink channel. When the events are completed then OK lead is released or dropped, and other slave processors can now transmit. While being blocked, a slave processor waiting to transmit needs to determine whether to buffer or discard its data. This depends on the type of data and is determined by the type of data being handled by a slave processor.

Figure 4:
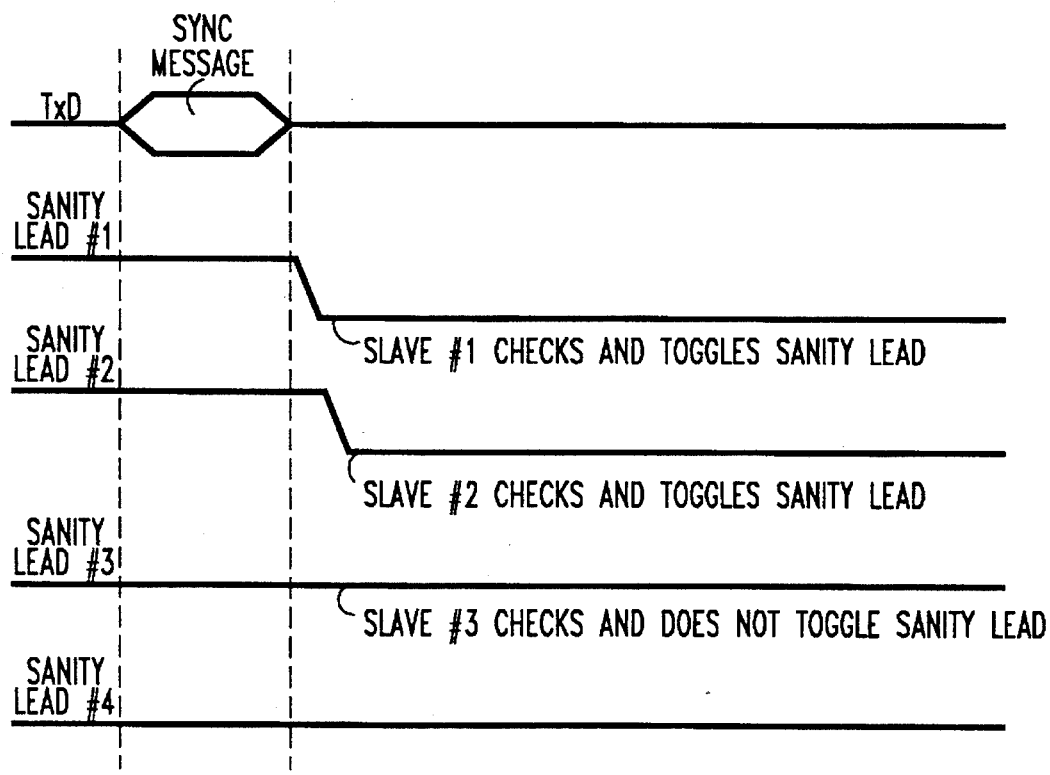
FIG. 4 shows a timing diagram illustrating how a slave processor may toggle its associated sanity lead.

Slave processors on the bus 113 may optionally include a sanity verification. For processors requiting sanity, individual sanity and reset leads are connected from each slave processor (120, 130, 141 and 151) to the master processor 112, via bus 118. Whenever a slave processor receives a sync message 205 it must toggle the state of its sanity lead. If it does not, the master processor 112 assumes a sanity error has occurred and sends a reset signal over the reset lead to the slave processor. This is shown in FIG. 4, where, in response to a sync message 205, slave processors 120 and 130 have toggled their sanity leads, respectively, sanity leads 1 and 2, while slave processor 141 and 151 have not toggled their sanity leads, respectively, sanity leads 3 and 4. Thus, in this example, master processor 112 resets slave processors 141 and 151 via their associated reset leads. If a slave processor maintains its own sanity then this interface is not necessary. Some slave processors on bus 113 may have their sanity controlled by the master processor 112, and others may control it themselves.

The addressing bus 117 can be used to send information to specify the priority number of the slave processors. Addressing can take two forms: either all slave processors "know" where they are in the chain (i.e., on bus 113), and are hard coded with this information; or they support an addressing interface. Different slave processors on the same link can use different methods. The addressing bus 117 consists of n-leads, where n is equal to log base 2 of the number of secondary devices connected to the addressing bus 117. In our example, two leads are needed to uniquely address four slave processors.

Figure 5:
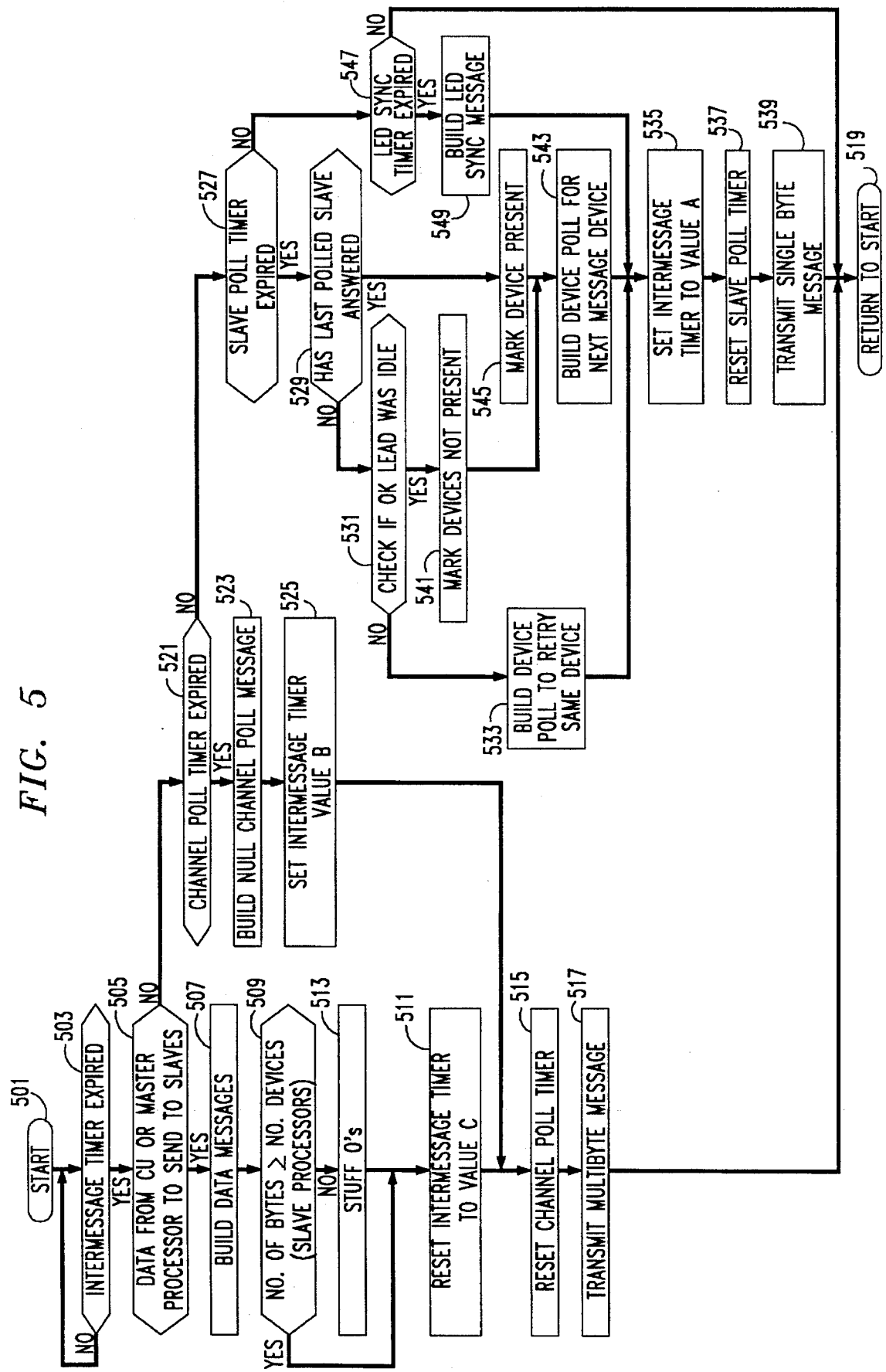
FIG. 5 is a flow chart describing the operation at a master processor.

With reference to FIGS. 1, 2 and 5 we describe the operation of master processor 112. In step 501 the transmit process begins. In step 503 the intermessage timer is checked. The intermessage timer is set to different timer values depending on the downlink message transmitted. This timer allows the slave processors enough time to respond to any message sent by the master processor 112. If the intermessage timer has expired, then step 505 is performed, otherwise the master processor 112 waits until that timer has expired. In step 505 it is determined if data originating from control unit 102 or master processor 112 is available to send to slave processors 120, 130, 141 or 151. If data is available then in step 507 the master processor builds the data message 201. In step 509 it is determined whether the number of bytes is greater than or equal to the number of slave processors (devices) connected to master processor 112 over bus 113. In our example, the number of bytes must be greater than or equal to four (M=4). If the answer to 509 is yes, then in step 511 the intermessage timer is reset to a value C. The timer value C provides enough time for a slave processor to respond to the data message to be transmitted. If the answer to step 509 is no, then in step 513 master processor stuffs null messages as part of data message 201. Thereafter, step 511 would be performed. After completion of step 511, master processor in step 515 resets the channel poll timer. The channel poll timer sets the maximum allowable time period between data messages. If the channel poll timer elapses, then a channel poll message is sent. Since slave processor can only respond after a data message or a channel poll message, the channel poll timer determines, worst case, how long a slave processor has to wait to respond. In step 517 master processor transmits the multi-byte data message over lead TXD lead 115. In step 519 control is returned to step 501.

In step 505, if no data is available from either control unit 102 or master processor 112 then, in step 521 it is determined if the channel poll timer has expired. If it has, then in step 523 master processor builds a null channel poll message as shown in 204. In step 525 the intermessage timer is set to a value B (where B is less than C). Following step 525 steps 515, 517 and 519 are performed as previously described. Returning to step 521, if the channel poll timer has not expired then in step 527 it is determined if the slave poll timer has expired. The slave poll timer is used to determine, worst case, how often master processor 112 checks (using a device poll message 203) if the various slave processors (devices) are still active or present. If the slave poll timer has expired, then in step 529 it is determined if the last polled slave processor has responded. This is determined by checking a slave status buffer at the master processor associated with that slave processor or device. If the answer to step 529 is no, then in step 531 it is determined if the OK lead was idle at any time since the last poll was sent. If the OK lead was not idle then master processor builds a device poll message to be sent to the same device. Note, an idle OK lead means that no slave processor is ready to transmit. In step 535, the intermessage timer is set to a value A (where A is less than B). In step 537 the slave poll timer is reset. In step 539 master processor transmits the single byte message over TXD lead 115. Thereafter, control returns to the start step 501.

Returning to step 531, if the OK lead was idle, then in step 541 master processor marks that device or slave processor as not being present. Thus, the uplink channel was available and the polled device did not respond. In step 543 master processor builds a device poll message (e.g., 203) for the next device or slave processor. Following step 543 step 535 is performed as previously described.

Returning to step 529, if the last polled slave processor has answered, then in step 545 master processor marks the slave status buffer for that slave processor or device as being present on bus 113. Thereafter, step 543 is performed as previously described.

Returning to step 527, if the slave poll timer has not expired, then in step 547 the master processor determines if the LED sync timer has expired. If it has, then in step 549 the master processor 112 builds an LED sync message. Thereafter step 535 is performed as previously described. In step 547 if the LED sync timer has not expired, then control returns to the start step 501. The sync timer ensures that the slave processors will periodically be synchronized.

In one embodiment, the sync timer and slave poll timer may be approximately two seconds, the channel poll timer may be 30 to 50 milliseconds, while the various intermessage timer values (A, B, C) may vary from 2 to 15 milliseconds.

Figure 6:
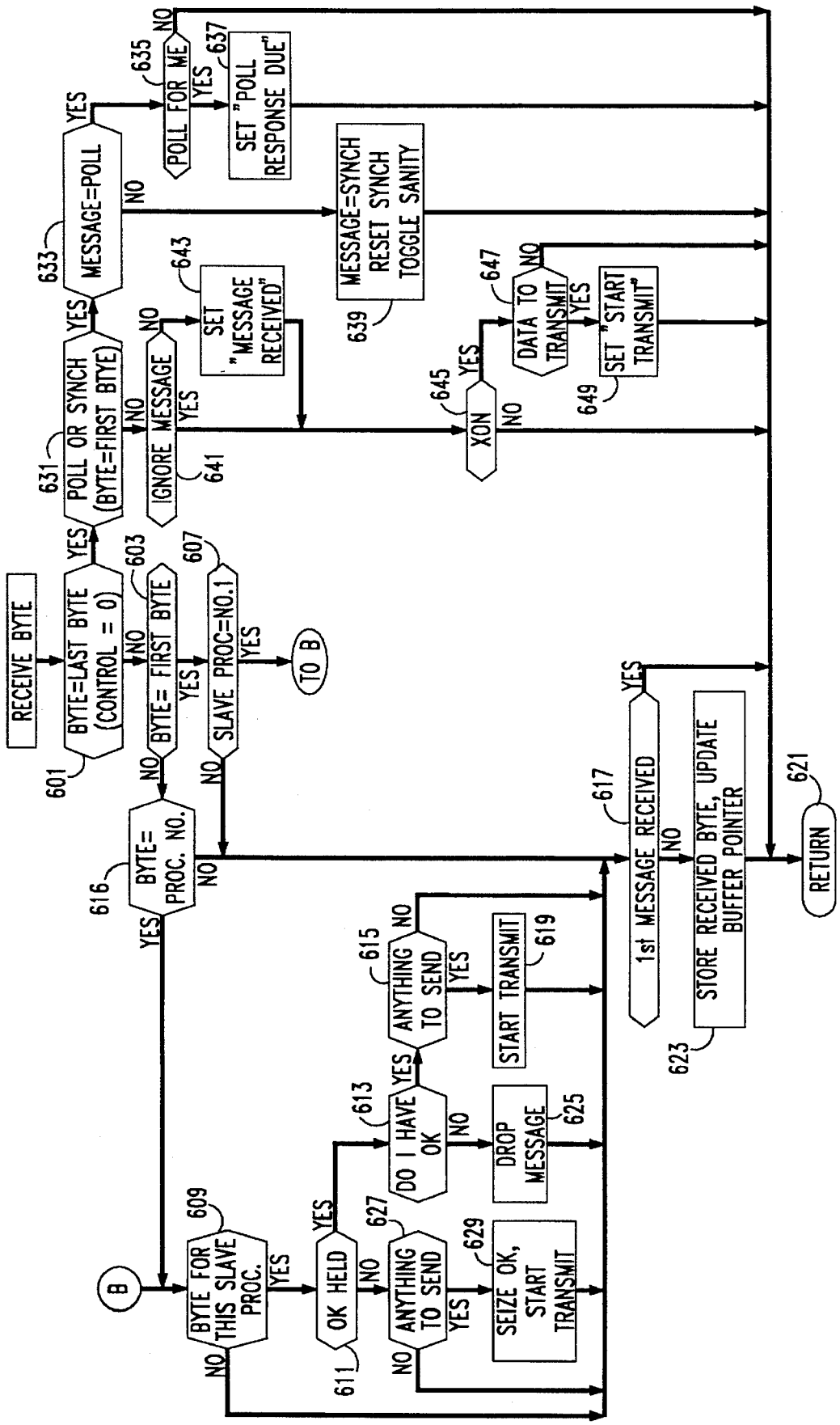
FIGS. 6 and 7 describe, respectively, the receive and transmit operations at a typical slave processor.

With reference to FIGS. 1, 2 and 6 we describe the operation of an illustrative slave processor after a byte has been received, in step 600, from master processor 112 over TXD bus 114. In step 601, the slave processor determines if a received byte is the last byte of a downlink message. Recall that a last byte can be determined by checking for a control bit equal to zero. If it is not the last byte, then in step 603 it is determined if it is the first byte of a message. If it is, then step 607 is performed. In step 607 it is determined if this slave processor is the first slave processor. This is done by checking a slave address buffer. If it is, then in step 609 it is determined if the byte number is one assigned to the slave processor. That is, is the byte number one plus the slave processor number. If it is, then in step 611 the slave processor monitors the OK lead and determines if the OK lead is already in the held or seized state. If it is, in step 613 it is determined if this particular slave processor is holding the OK lead. If the answer is yes, then in step 615 the slave processor determines if it has any data to send to master processor over RXD lead 114. If there is no data to send, then in step 617 it is determined if the received message is the first message received. In step 615 if there was data to send, then in step 619 the slave processor starts to transmit. Thereafter, step 617 is performed as previously described. In step 617 if the first message was received, then control returns in step 621. In step 617 if the first message was not received, then in step 623 the slave processor stores the received byte and updates the buffer pointer. Following step 623, step 621 is performed as previously described.

Returning to step 613, if it is determined that the slave processor has not seized the OK lead, then in step 625 the slave processor's messages are dropped. This is optionally done to prevent out-of-sequence events from different slave processors. Thereafter step 617 is performed as previously described.

In step 611 if the OK lead is not held, then in step 627 it is determined if the slave processor has any data to send. If it does not then control is transferred to step 617. If there is data to send, then in step 629 the slave processor establishes a seized state on the OK lead. Thereafter, the slave processor starts to transmit. Thereafter step 617 is performed as previously described.

In step 609 if it is determined that the slave processor is not associated with the received byte, then control is transferred to the previously-described step 617. In step 603, if it is determined that the received byte is not the first byte then control is transferred to step 616. In step 616, it is determined if the byte number is equal to one plus the slave processor number. If it is, then control transfers to the previously-described step 609. Otherwise, control transfers to the previously-described step 617.

Returning to step 601, if it is determined that the byte number is the last byte, then step 631 is performed. In step 631, the slave processor determines whether the poll or sync message, respectively, 202 and 205, have been received. Thus, in step 631 it is determined whether the last byte is, in fact, the first byte. If in step 631 a poll or sync message was received, then in step 633 it is determined whether the message was a poll message. If it was, then in step 635 it is determined if the poll message was directed to this slave processor. If the answer is yes, then slave processor sets its "poll response due" flag in step 637 and control returns to the previously-described step 621. In step 635 if the poll message was not for this slave processor then control transfers to step 621.

In step 633, if no poll message was received, then in step 639 it is determined that a sync message was received, synchronization is reset and the optional sanity lead 118 is toggled. Thereafter, control transfers to the previously-described step 621.

In step 631, if the receive byte was not the poll or sync message, then in step 641 it is determined whether the message should be ignored. If the message should not be ignored, then the "message received" flag is set in step 643. In step 645 it is determined if the XON state exists in the status byte of data message 201. In step 641, if it's determined that the message should be ignored then control is also transferred to step 645. In step 645, if the XON status does not exist, then the previously-described 621 is performed. In step 645, if the XON status exists, then in step 647, slave processor determines if it has data to transmit. If no data exists, then control returns to step 621. If data exists, then in step 649 the "start transmit" flag is set and control transfers to step 621.

Figure 7:
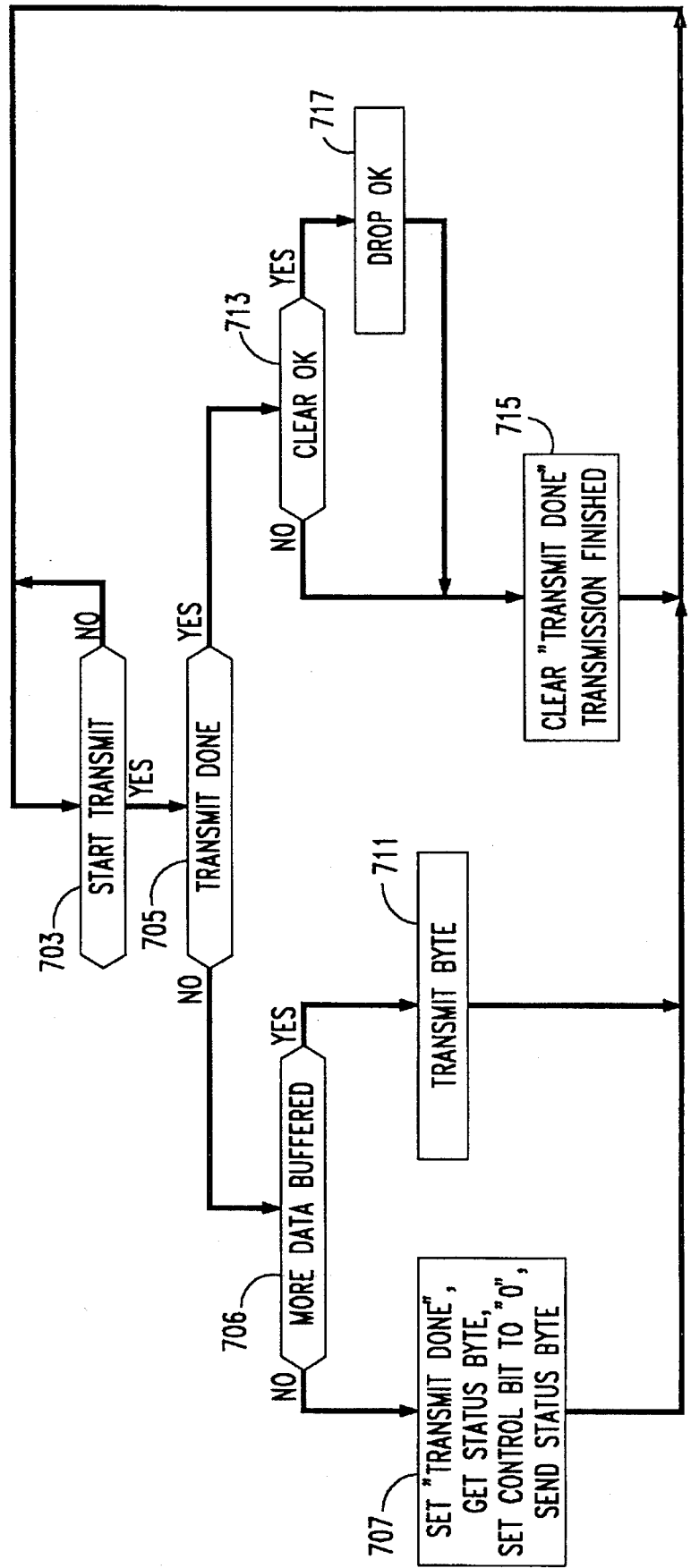

With reference to FIGS. 1, 2 and 7, we describe the operation at a slave processor after a data byte has been transmitted uplink to master processor 112 over bus RXD 114. In step 703 it is determined if transmission has started. If not then the slave processor periodically checks if transmission has started. When transmission has finally started, then in step 705 it is determined if the slave processor's message transmission is done. If it is not done, then in step 706 it is determined if there is more data which is buffered and ready for transmission. If there is no more data, then in step 707 the "transmit done" flag is set, a status byte is generated, the control bit of that status byte is set to logic zero, and that status byte transmitted. Following step 707, the slave processor rearms the receive interrupt and control is returned in step 703.

If there is more data in step 706 then in step 711 the slave processor obtains the next data byte and sends that data byte in an uplink message. Thereafter, control transfers to the previously-described step 703.

In step 705 if it is determined that the transmit operation is complete, then in step 713 the slave processor determines if it should clear the OK lead. If the OK lead should not be cleared then in step 715 the "transmit done" flag is cleared, i.e., transmission is finished, and control returns to step 703. In step 713, if it is determined that the OK lead should be cleared, then in step 717 the slave processor drops the OK lead.

What has been described is merely illustrative of the application of the principles of the present invention. Other arrangements and methods can be implemented by those skilled in the art without departing from the spirit and scope of the present invention.

We claim:

1. A communication arrangement for enabling communications between a master communication unit and a plurality (M) of slave communication units over a plurality of communication paths, said arrangement comprising at said master unit,
means for sending master information in a downlink message over a first communication path to said M slave units, said downlink message including a number N of information bytes, where N≧M, each byte except a last byte comprising a data portion followed by a control bit at a first state and said last byte comprising a status portion followed by a control bit at a second state; and
means for receiving slave information in an uplink message over a second communication path from at least one of said M slave units, said uplink message including at least one information byte, wherein each byte except a last byte comprises a data portion followed by a control bit at a first state and said last byte comprises a status portion followed by a control bit at a second state;
third communication path connected between said master unit and said M slave units for enabling a first slave unit to signal other slave units of the first slave unit's desire to send information to said master unit; and
wherein at least one slave unit includes
means for monitoring a state of said third path during the reception of said downlink message frame over said first path,
means responsive to a first state of said third path and an indication that that slave unit is to send an uplink message over said second path following the reception of said downlink message, for establishing a second state on said third path during a predetermined unique byte of said received downlink message, the unique byte being associated with said at least one slave unit, and
means for sending said uplink message over said second path after the complete reception of said downlink message as determined by said control bit at said second state in said last byte of said downlink message.

2. The arrangement of claim 1 wherein said downlink message is a data message including a status byte and a number of data bytes which is always greater than or equal to M and less than a predetermined maximum number, and wherein null data bytes are sent when there is insufficient data to occupy all M data bytes. Unchanged claim 3:

3. The arrangement of claim 1 wherein said downlink message is sent asynchronously. Unchanged claim 4:

4. The arrangement of claim 3 wherein if no downlink message has been sent within a predetermined time interval, an M byte channel poll downlink message is sent having M−1 bytes of predefined data and one status byte.

5. The arrangement of claim 1 wherein said master unit also sends a one-byte sync downlink message over said first path including timing information to one or more of said M slave units and wherein said slave unit further includes
means for resetting apparatus thereat in response to a received sync downlink message.

6. The arrangement of claim 1 wherein said master unit sends a one-byte device poll downlink message identifying one of said M slave units and wherein said slave unit further includes
means for setting a poll response due flag and
means for sending an uplink message in response to a set poll response due flag and following reception of said downlink message.

7. The arrangement of claim 6 wherein said master unit follows said device poll downlink message with a channel poll downlink message having M bytes of predefined data and one status byte.

8. The arrangement of claim 7 wherein said identified slave unit further includes
means for sending an uplink message in response to a set poll response due flag and following reception of said channel poll downlink message.

9. The arrangement of claim 8 wherein said uplink message is a device poll response including one status byte.

10. The arrangement of claim 8 wherein said uplink message is a data message including one or more data bytes and one status byte.

11. The arrangement of claim 1 wherein said downlink message is a channel poll downlink message including a plurality of information bytes, each byte except a last byte comprising a null data portion followed by a control bit at a first state and said last byte comprising a status portion followed by a control bit at a second state.

12. Apparatus for enabling communications over a plurality of communication paths connected thereto, said apparatus comprising means for receiving a downlink message over a first communication path, said downlink message including a plurality of information bytes, each byte except a last byte comprising a data portion followed by a control bit at a first state and said last byte comprising a status portion followed by a control bit at a second state;

means for monitoring a state of a third communication path during the reception of said downlink message;

means, responsive to a first state of said third path and an indication that said apparatus desires to send an uplink message, for establishing a second state on said third path during a predetermined unique byte of said received downlink message, the unique byte being associated with said apparatus; and means for sending an uplink message over a second communication path after the complete reception of said downlink message as determined by said control bit at said second state in said last byte of said downlink message, said uplink message including at least one information byte, wherein each byte except a last byte comprises a data portion followed by a control bit at a first state bit and said last byte comprises a status portion followed by a control bit at a second state.

13. The apparatus of claim 12 including means for receiving a sync downlink message over said first path including timing information, and means for resetting predetermined units thereat in response to a received sync downlink message.

14. The apparatus of claim 13 including means for receiving a device poll downlink message identifying said apparatus, means for setting a poll response due flag at said apparatus, and means for sending an uplink message in response to a set poll response due flag and following reception of said downlink message.

15. The apparatus of claim 14 wherein said uplink message is a device poll response including one status byte.

16. The apparatus of claim 14 wherein a channel poll downlink message is received following said device poll downlink message and wherein said arrangement further includes means for sending an uplink message in response to a set poll response due flag and following reception of said channel poll downlink message.

17. The apparatus of claim 12 wherein said downlink message is a channel poll downlink message including a plurality of information bytes, each byte except a last byte comprising a null data portion followed by a control bit at a first state and said last byte comprising a status portion followed by a control bit at a second state.

18. A method of communicating with an apparatus over a plurality of communication paths connected thereto, said method comprising the steps of receiving a downlink message over a first communication path, said downlink message including a plurality of information bytes, each byte except a last byte comprising a data portion followed by a control bit at a first state and said last byte comprising a status portion followed by a control bit at a second state;

monitoring a state of a third communication path during the reception of said downlink message;

establishing, in response to a first state of said third path, and an indication that said apparatus desires to send an uplink message, a second state on said third path during a predetermined unique byte of said received downlink message, the unique byte being associated with said apparatus; and sending an uplink message over a second communication path after the complete reception of said downlink message as determined by said control bit at said second state in said last byte of said downlink message, said uplink message including at least one information byte, wherein each byte except a last byte comprises a data portion followed by a control bit at a first state and said last byte comprises a status portion followed by a control bit at a second state.

19. A method of communicating between a master communication unit and a plurality (M) of slave communication units over a plurality of communication paths, said method comprising the steps of at said master unit, sending master information in a downlink message over a first communication path to said M slave units, said downlink message including a number N of information bytes, where N≧M, each byte except a last byte comprising a data portion followed by a control bit at a first state and said last byte comprising a status portion followed by a control bit at a second state; and receiving slave information in an uplink message over a second communication path from at least one of said M slave units, said uplink message including at least one information byte, wherein each byte except a last byte comprises a data portion followed by a control bit at a first state and said last byte comprises a status portion followed by a control bit at a second state;

enabling, over a third communication path connected between said master unit and said M slave units, a first slave unit to signal other slave units of the first slave unit's desire to send information to said master unit; and at at least one slave unit monitoring a state of said third path during the reception of said downlink message frame over said first path, and establishing, in response to a first state of said third path and an indication that that slave unit is to send an uplink message over said second path following the reception of said downlink message, a second state on said third path during a predetermined unique byte of said received downlink message, the unique byte being associated with said at least one slave unit; and sending said uplink message over said second path after the complete reception of said downlink message as determined by said control bit at said second state in said last byte of said downlink message.

20. A terminal arrangement for enabling communications to a control unit of a communication system via a first facility and and for enabling communications to one or more (M) adjuncts connectable via a second facility including a plurality of communication paths, said terminal arrangement comprising means for sending master information in a downlink message over a first communication path to said M adjuncts, said downlink message including a number N of information bytes, where N≧M, each byte except a last byte comprising a data portion followed by a control bit at a first state and said last byte comprising a status portion followed by a control bit at a second state;

means for receiving adjunct information in an uplink message over a second communication path from at least one of said M adjuncts after the complete sending of said downlink message as determined by said control bit at said second state in said last byte of said downlink message, said uplink message including at least one information byte, wherein each byte except a last byte comprises a data portion followed by a control bit at a first state and said last byte comprises a status portion followed by a control bit at a second state; and third communication path connected between said terminal arrangement and said M adjuncts for enabling a first adjunct to signal other adjuncts of the first adjunct's desire to send adjunct information to said terminal arrangement, said third path having a first state during the transmission of said downlink message frame over said first path and wherein said third path is established at a second state during a predetermined unique byte of said transmitted downlink message to indicate said first adjunct's desire to send adjunct information to said terminal arrangement, the unique byte being associated with said first adjunct.

* * * * *